United States Patent

[11] 3,587,828

| [72] | Inventor | Alexander Ferko |
| | | Salem, Ohio |
| [21] | Appl. No. | 794,223 |
| [22] | Filed | Jan. 27, 1969 |
| [45] | Patented | June 28, 1971 |
| [73] | Assignee | Gulf & Western Industrial Products Company |
| | | Grand Rapids, Mich. |

[54] CONVEYING APPARATUS
6 Claims, 7 Drawing Figs.

[52] U.S. Cl. ................................................. 198/108
[51] Int. Cl. ............................................... B65g 35/08
[50] Field of Search ........................................... 198/33
(R4), 127, 108, 34, 25, 211; 214/1 (P)

[56] References Cited
UNITED STATES PATENTS
1,763,883  6/1930  Colvin ........................... 198/127

3,202,263  8/1965  Stuller .......................... 198/34

Primary Examiner—Edward A. Sroka
Attorney—Meyer, Tilberry and Body

ABSTRACT: Conveying apparatus for conveying elongated bars and the like including a plurality of generally horizontal rows of star wheel members each having radially extending arms. The star wheel members in each row are mounted for rotation about an axis common to all other star wheels in the same row and generally parallel to the axis of the star wheels in the next adjacent row. The arms of the star wheels in each row are offset from those in the next adjacent rows and the arms are of a length sufficient to produce a substantial overlap between star wheels in adjacent rows. Additionally, drive means are provided so that the star wheels are all rotated in the same direction. Consequently, a bar supported by arms of the star wheels in one row will be transferred to the arms of the star wheels in the next adjacent row in the direction of rotation.

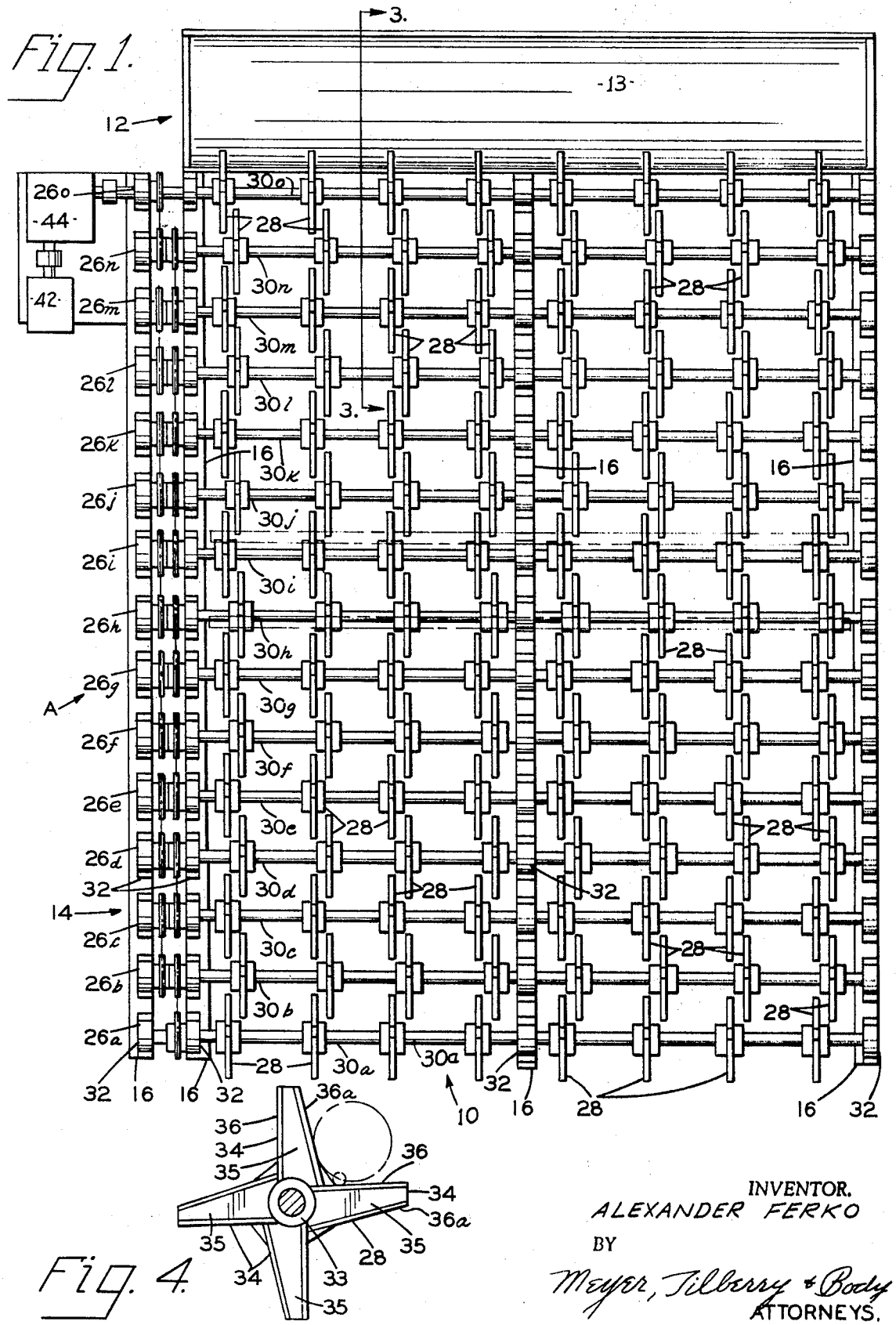

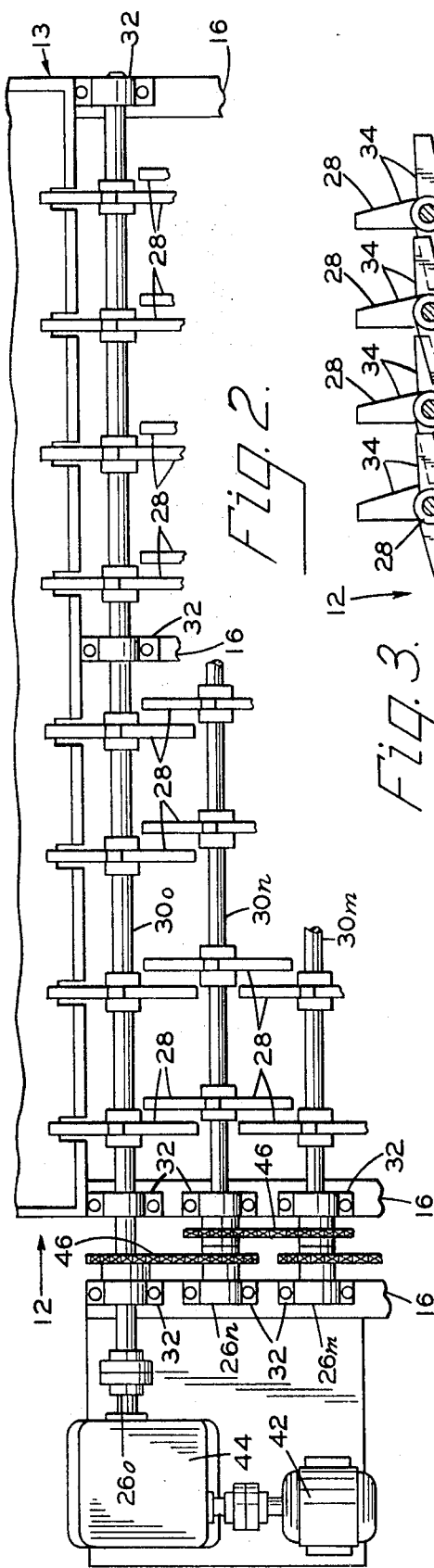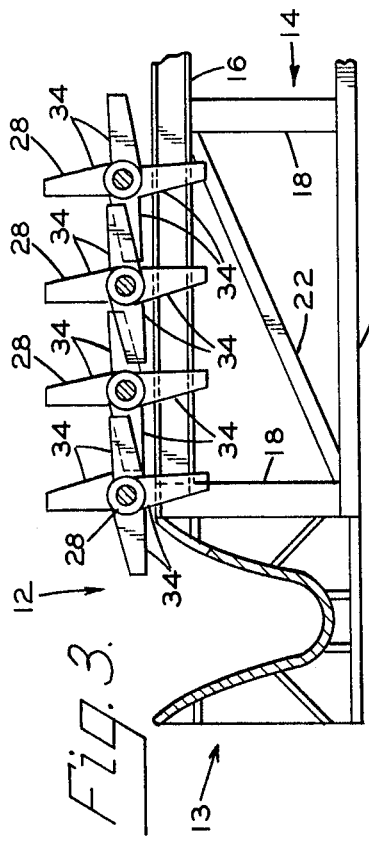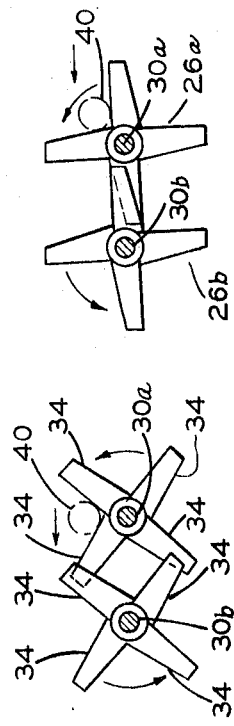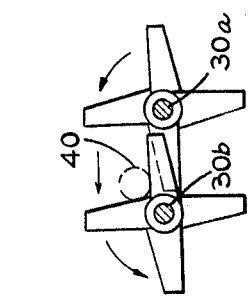

CONVEYING APPARATUS

The present invention is directed toward the conveying art and, more particularly, to an apparatus for conveying elongated members in a direction transverse to their longitudinal axis while simultaneously rotating them about their respective axes.

The invention is especially suited for conveying hot metal rods and bars and will be described with particular reference thereto; however, as will become apparent, the invention is capable of broader application and could be used for conveying a variety of similarly shaped members.

In the manufacture of rolled bars of different cross-sectional shapes it is necessary to transfer the bars at temperatures as high as 1800° F. The apparatus for accomplishing this is generally referred to as a cooling bed and is arranged to permit cool air to freely circulate around the bars as they are being transferred. In the past, a variety of types of cooling beds have been used, among which have included simple inclined rail supports with tripping devices to turn the bars, or dog-type chain drag arrangements which drag the hot bars across the top of heavy rails.

One common problem with substantially all these prior cooling beds has been their inability to eliminate uneven cooling that produces bowing of the bars. Additionally, many of the prior beds can not satisfactorily handle bars of a variety of cross-sectional shapes.

The present invention provides an arrangement which is extremely simple, yet capably of readily transferring bars of any cross-sectional shape while continuously rotating the bars about their longitudinal axes. In particular, according to the invention the apparatus includes a plurality of generally horizontal rows of star wheel members each having radially extending arms. The star wheel members in each row are mounted for rotation about an axis common to all other star wheels in the same row and generally parallel to the axis of the star wheels in the next adjacent row. Additionally, the arms of the star wheels in each row are offset from those in the next adjacent rows and the arms are of a length sufficient to produce a substantial overlap between star wheels in adjacent rows. Consequently, when the star wheels are all rotated in the same direction, a bar supported by the arms of the star wheels in one row will be transferred to the arms of the star wheels in the next adjacent row in the direction of rotation. Further, the transfer is accomplished with a rotation of the bar about its longitudinal axis.

As is apparent, with apparatus constructed in accordance with the invention, the transfer of the bars is accomplished with a continual changing of the arms on which the bars are supported. This, in combination with the rotation of the bars about their longitudinal axes, assures that cooling takes place uniformly without the development of cold spots. Moreover, the arrangement is such that it can handle bars of any cross-sectional shape.

Accordingly, a primary object of the invention is the provision of a conveying apparatus which is capable of conveying elongated members in a direction transverse to their longitudinal axis while continuously rotating them about their respective axes.

Another object is the provision of a conveying apparatus that is especially suited for conveying hot bars and the like in a manner to prevent uneven cooling of the bars.

Still another object is the provision of apparatus of the type described which is simple to construct and operate.

A further object is the provision of an apparatus of the type discussed which is capable, without modification, of handling members of a variety of lengths and cross-sectional shapes.

These and other objects and advantages will become apparent from the following description when read in conjunction with the accompanying drawings wherein:

FIG. 1 is a plan view of a cooling bed constructed in accordance with a preferred embodiment of the invention;

FIG. 2 is enlarged, partial plan view of the discharge end of the apparatus showing the drive mechanism in detail;

FIG. 3 is cross-sectional elevational view taken on line 3-3 of FIG. 1;

FIG. 4 is an enlarged side elevation of one of the star wheel members; and,

FIGS. 5—7 are side elevations of two star wheel members showing how transfer takes place between the wheels.

Referring more particularly to the drawings wherein the showings are for the purpose of illustrating a preferred embodiment of the invention only, and not for the purpose of limiting same FIG. 1 shows, in plan view, a cooling bed A arranged to convey elongated bars and the like from inlet end 10 to the outlet or discharge end 12. The particular mechanism used to deliver the bars to the inlet end of the bed is not shown and could be of any desired construction. Likewise, although the apparatus is shown as a discharging to a hopper or cradle 13 this is not of significance to the invention.

Referring more particularly to the cooling bed A, it will be noted that in the subject embodiment, the cooling bed includes a suitable main frame 14 which extends longitudinally between the inlet 10 and outlet 12 and is preferably constructed from conventional structural angles and beams. As shown in FIGS. 1—3, the frame includes four I-beams 16 which extend generally parallel and are supported a desired distance above the floor by vertically positioned members 18. The members 18 are connected to base plate members 20 (See FIG. 3) and suitable cross braces 22 extend between various ones of members 18.

As can be seen, the frame 14 is relatively open so that cooling air can circulate freely through the frame and upwardly across hot bars and the like being transferred across the unit. The conveying portion of the unit is similarly open and comprises a plurality of rows 26a—26o of star wheels 28. The star wheels 28 in each row are mounted for rotation about a common axis and the rows are generally parallel to one another.

Although the star wheels could be independently mounted or mounted in groups, in the embodiment shown the star wheels 28 in each row are keyed or otherwise positively connected to rotatably mounted shafts 30a—30o. The shafts 30a—30o are carried in antifriction bearing pillow locks 32 connected to the tops of the frame members 16. The number and spacing of the pillow blocks 32 provided for each shaft 30 is not of importance to the invention and, of course, depends upon the length of the shafts, the weight of the material being transferred, etc.

The actual construction of the star wheels could vary considerably depending upon the material being conveyed, its temperature, etc. According to the preferred embodiment however, the star wheels 28 each included a central hub 33 (See FIGS. 1 and 4) which is keyed to its respective shaft. Four, fabricated steel arms 34 are welded to the hub 33 and extend radially therefrom at approximately 90° spacings. Each of the arms 34 include a web section 35 and opposed laterally extending support sections 36 and 36a. The sections function as the material-supporting surfaces and can vary substantially in their lateral extent i.e. width; however, they are preferably relatively narrow, as shown in FIG. 2, so as to provide a minimum of interference with the free flow of cooling air vertically through the unit. Further, for reasons which will hereafter become apparent, it is preferable that the section 36a be inclined relative to the axis of rotation in the manner shown in FIG. 4.

Of particular importance to the invention is the layout and relative positioning of the star wheels in adjacent rows. Referring to FIGS. 2 and 3, it will be seen that the star wheels in each row are each positioned with their arms 34 aligned with all of the other star wheels in the same row. That is, the support sections 36 and 36a line in common planes parallel to the axis of rotation. Additionally, the star wheels in each row are laterally offset from those in the next adjacent row and the arms 34 are of a length such that they overlap those in the next adjacent row by a considerable amount.

Directing attention to FIGS. 5—7, the manner in which transfer of bars and the like takes place with the apparatus will now be explained. Assume that the star wheels are in the position shown in FIG. 5 and that a circular bar 40 (shown dotted) has been positioned on the rightwardly extending arms 34 of the star wheels of row 26a. The bar 40 is, of course, supported by the top surfaces of the support sections 36 of the star wheels and extends parallel to the shaft 30a. Assume also, for the purposes of explanation that only the star wheels 28 of row 26a are rotated 90° counterclockwise (As viewed in FIG. 5). This will cause bar 40 to be moved through an arcuate path into engagement with the rightwardly extending arms of the star wheels of row 26b (See FIG. 7). Additionally, as will be noted, because of the incline of section 36a, member 40 is caused to roll to the left shortly before the star wheels have rotated a full 90°. This rotation is in addition to that which is achieved by the rotation of the star wheels.

As can be appreciated, by sequentially rotating each of the rows of star wheels from the inlet to the outlet, the bar 40 will be conveyed across the unit. In actual use, however it is preferred to simultaneously rotate all of the rows. This permits the apparatus to convey a bar on each row of star wheels. As shown in FIG. 6, when the adjacent rows are simultaneously rotated, the transfer between rows takes place in the same manner since at the time the first row of star wheels has reached the position shown in FIG. 7, the next adjacent row has reached the same position.

Although it would be possible to index the rows of star wheels in 90° increments, a simpler drive arrangement is possible if the rows are simultaneously and continuously rotated. For this reason, the subject apparatus includes a conventional variable speed electric drive motor 42 which is connected to shaft 30o through a right-angle gear reducer 44. The shafts 30a—30 are, in turn, drivingly interconnected by roller chains 46 extending between adjacent shafts. This provides an extremely simple drive which assures that each row of star wheels is simultaneously driven at the same speed in the same direction.

As can be appreciated the speed at which the star wheels are rotated is dependent upon the period of time it is desired to retain the bars on the cooling bed. With the subject arrangement this time period can be readily varied to meet substantially any need. Further, the apparatus can handle bars of substantially any cross-sectional configuration and length. Note that the bars handled can vary in lengths from as long as the width of the bed and longer, to nearly as short as the spacing between adjacent star wheels in the same row. With regard to cross-sectional shapes, it should be noted that for flat bars the apparatus provides a 90° rotation of the bar with each row-to-row transfer. Similarly, with round bars each row-to-row transfer produces a rotation of an indefinite number of degrees but, in no case less than 90°. Other shapes, e.g., hexagons, octagons, etc., are also rotated at least 90° with each row-to-row transfer.

In addition to the continual rotation of the bars during transfer, it should be pointed out that the longitudinal points along the bar which are in engagement with the arms varies with each row-to-row transfer. The combination of continual rotation of the bars plus variation in the support points eliminates "cold spots" and resultant bending or warpage of the bars. Further, the number of points on which the bars are supported can be varied by varying the number of star wheels provided.

The invention has been described in great detail sufficient to enable one of ordinary skill in the conveyor art to make and use the same. Obviously modifications and alterations of the preferred embodiment will occur to others upon a reading and understanding of the specification and it is my intention to include all such modifications and alterations as part of my invention insofar as they come within the scope of the appended claims.

I claim:

1. Apparatus especially suited for conveying elongated substantially cylindrical articles comprising, frame means, a plurality of generally horizontal and parallel rows of star wheel members supported by said frame means, each of said star wheel members having at least two radially extending arms, the star wheel members in each row being rotatable about a common axis for the radially extending arms thereof to pick up and deliver a substantially cylindrical article to the radially extending arms of the next adjacent row of star wheel members, the radially extending arms of said star wheel members in adjacent rows being laterally offset and partially overlapping, adjacent arms of each star wheel member in adjacent rows having cooperating article supporting surfaces therebetween disposed at an angle of more than 90° relative to one another, one of said article-supporting surfaces upon rotation of said star wheel members to advance a cylindrical article to the next adjacent row of star wheel members being horizontal during pick up on the article and the other of said article-supporting surfaces being inclined radially outwardly and downwardly from horizontal during delivery of the article to the next row of star wheel members to induce rolling of said article toward said next row during delivery, and drive means for rotating all of said star wheel members at the same speed and in the same direction.

2. The apparatus as defined in claim 1 wherein said drive means includes means for simultaneously rotating all of said star wheels.

3. The apparatus as defined in claim 1 wherein at least the star wheels in alternate rows have at least four arms.

4. The apparatus as defined in claim 1 wherein said star wheels have at least four radially extending arms spaced approximately 90° apart.

5. The apparatus as defined in claim 1 wherein each said row of star wheels is carried on a separate shaft means.

6. The apparatus as defined in claim 5 wherein all of said shaft means are commonly driven.